(12) United States Patent
Bhakta et al.

(10) Patent No.: US 7,831,469 B2
(45) Date of Patent: Nov. 9, 2010

(54) VERIFYING AUDIO OUTPUT AT A CLIENT DEVICE

(75) Inventors: Dharmesh Bhakta, Austin, TX (US); Juan F. Obas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1446 days.

(21) Appl. No.: 10/406,659

(22) Filed: Apr. 3, 2003

(65) Prior Publication Data

US 2004/0199420 A1 Oct. 7, 2004

(51) Int. Cl.
*G06Q 30/00* (2006.01)

(52) U.S. Cl. .......................... 705/14.1; 725/32; 725/34

(58) Field of Classification Search ................... 705/14, 705/22, 14.1, 32
See application file for complete search history.

(56) References Cited

U.S. PATENT DOCUMENTS

| | | | | |
|---|---|---|---|---|
| 4,065,647 | A * | 12/1977 | Frye et al. | 381/60 |
| 5,363,147 | A | 11/1994 | Joseph et al. | 348/738 |
| 5,369,440 | A | 11/1994 | Sussman | 348/462 |
| 5,778,077 | A | 7/1998 | Davidson | 381/57 |
| 5,781,894 | A | 7/1998 | Petrecca et al. | 705/14 |
| 5,848,397 | A | 12/1998 | Marsh et al. | 705/14 |
| 6,009,410 | A | 12/1999 | LeMole et al. | 705/14 |
| 6,311,211 | B1 | 10/2001 | Shaw et al. | 709/206 |
| 6,363,488 | B1 * | 3/2002 | Ginter et al. | 726/1 |
| 6,442,529 | B1 | 8/2002 | Krishan | |
| 6,607,136 | B1 * | 8/2003 | Atsmon et al. | 235/492 |
| 6,625,448 | B1 * | 9/2003 | Stern | 455/425 |
| 7,380,060 | B2 * | 5/2008 | Guha et al. | 711/114 |
| 7,451,280 | B2 * | 11/2008 | Furtek et al. | 711/149 |
| 2001/0032122 | A1 | 10/2001 | Hankla | 705/14 |

(Continued)

FOREIGN PATENT DOCUMENTS

JP 08187333 7/1996

(Continued)

OTHER PUBLICATIONS

White, Ron, "How Computers Work", Millennium Ed., Que Corporation, Indianapolis, IN, 1999.*

(Continued)

*Primary Examiner*—Andrew J. Fischer
*Assistant Examiner*—Chrystina Zelaskiewicz
(74) *Attorney, Agent, or Firm*—Matthew W. Baca; Amy J. Pattillo

(57) ABSTRACT

An apparatus and method for verifying the audio output at a client device are provided. With the apparatus and method, when a user requests access to resources, a profile for the user is retrieved and used to determine whether the user is to be presented with audio advertisements. If so, a test audio advertisement is sent to the client device. An agent application on the client device outputs the audio advertisement, via a speaker, to the user and records the audio that is being output by the speaker using a microphone or other recording device. The recording of the audio output is then sent back to the server that sent the original test audio advertisement for comparison. The server then compares the recording of the audio output to the original test audio advertisement. If the recording matches the original test audio advertisement, access to the resources is granted.

7 Claims, 4 Drawing Sheets

U.S. PATENT DOCUMENTS

| | | |
|---|---|---|
| 2002/0022999 A1* | 2/2002 | Shuster et al. ................ 705/14 |
| 2002/0062393 A1* | 5/2002 | Borger et al. ............... 709/246 |
| 2002/0067730 A1 | 6/2002 | Hinderks et al. ....... 370/395.52 |
| 2002/0095330 A1 | 7/2002 | Berkowitz et al. ............ 705/14 |
| 2002/0099798 A1 | 7/2002 | Fedorovsky et al. ........ 709/219 |
| 2002/0152117 A1* | 10/2002 | Cristofalo et al. ............. 705/14 |
| 2003/0014310 A1 | 1/2003 | Jung et al. .................... 705/14 |
| 2003/0120541 A1* | 6/2003 | Siann et al. ................... 705/14 |
| 2004/0064319 A1* | 4/2004 | Neuhauser et al. .......... 704/273 |

FOREIGN PATENT DOCUMENTS

| | | |
|---|---|---|
| JP | 2002185618 | 6/2002 |
| JP | 2002320051 | 10/2002 |
| JP | 2003037672 | 2/2003 |
| JP | 2003228272 | 8/2003 |
| KR | 2000-0030367 | 6/2000 |
| KR | 2001-0008244 | 2/2001 |

OTHER PUBLICATIONS

IBM Research Disclosure 450147, "Attention-Based Commerce for Digital Content", Oct. 2001, pp. 1788-1789.

Dataq Instruments White Paper, "Who Stopped the Music", one page.

http://www.ericsson.com/press/scomm99-1.html, Ericsson Press Release, "Y-Pay Internet Service Provider Selects Ericsson to Provide Internet Advertising Solution", pp. 1-2, Jan. 2003.

http://www.tincell.com/products.html, "TINVox Interactive Voice Ad Solutions by Tincell", pp. 1-4, Feb. 2003.

China Patent Office, Office Action, CN20090724, Dated Jul. 24, 2009, 7 Pages.

* cited by examiner

VERIFYING AUDIO OUTPUT AT A CLIENT DEVICE

BACKGROUND OF THE INVENTION

1. Technical Field

The present invention is directed to mechanism for verifying audio output at a client device. More specifically, the present invention is directed to verifying that audio output at a client device matches audio data sent to the client device and that the audio output at the client device is at a volume level desired by the sender of the audio data.

2. Description of Related Art

Advertising via the Internet has fast become a principle mechanism by which manufacturers and providers of goods and services are able to make the public aware of their offerings. Such advertising may take the form of pop-up ads, banner ads, and the like, which are associated with a web page that is accessed by a user of a client device having a web browser application. More often, these web based advertisements have associated sound that may convey additional advertisement information to the user of the web browser application, i.e. the potential customer.

The problem with advertisements having an audio component to them is that there is no guarantee that the user of the web browser on the client device has the audio output volume, i.e. speaker volume, turned to a sufficient level that the user is able to hear the audio component to the advertisement. This problem exists because the user of the client device has control over the speaker volume and thus, may intentionally or unintentionally have the speaker volume turned low or off so that the audio component of the advertisement is not heard by the user. As a result, the advertisement is not as effective as it would have been had the speaker volume been turned to a sufficient level to allow the user to experience the entire advertisement.

This may especially be a problem when a user is provided with access to resources in exchange for agreeing to view/listen to advertising. For example, a user may choose to not pay a monthly services fee for Internet access from an Internet Service Provider and as a result, agree to viewing/listening to advertising while browsing the World Wide Web. In such cases, the user may be able to circumvent his/her duty to listen to the advertisement by turning the speaker volume down or off and yet still be provided with access to the resources.

Thus, it would be beneficial to have an apparatus and method for verifying the audio output at a client device.

SUMMARY OF THE INVENTION

The present invention provides to verify the audio output at a client device. A user requests access to resources, such as during a log-on process, and a profile for the user is retrieved. The profile is then used to determine whether the user is to be presented with audio advertisements. If so, a test audio advertisement is sent to the client device.

An agent application present on the client device receives the test audio advertisement and outputs the audio advertisement to the user via an audio adapter and speaker. During the output of the audio advertisement, the client device agent application records the audio that is being output by the speaker using a microphone or other recording device. The recording of the audio output is then sent back to the server that sent the original test audio advertisement for comparison.

The server then compares the recording of the audio output to the original test audio advertisement. This may be done, for example, using pattern matching or the like. If the recording matches the original test audio advertisement, then it is determined that the user of the client device has the speakers turned on and the volume of the audio output is sufficient to hear the audio advertisement. In addition, characteristics of the audio output may be extracted from the recording data to determine how to adjust the parameters of future audio advertisements sent to the client device. For example, a volume level may be identified in the recording of the audio output and compared to a desired volume level for an audio advertisement. If the volume level is too low, the volume parameters sent with the original audio advertisement may be adjusted to compensate and thereby increase the volume of the audio output at the client device.

If there is a match between the recording of the audio output and the original test audio advertisement, then access to the resources is granted. While the user accesses the resources, additional audio advertisements may be sent to the client device and output via the speakers of the client device. As mentioned above, these additional audio advertisements may have their output parameters adjusted based on the comparison of characteristics of the recorded audio output to desired output characteristics for the particular audio advertisement.

If there is not a match between the recording of the audio output and the original test audio advertisement, then access to the resources is denied. In addition, a message may be sent to the client device informing the user of the denial of access as well as a request that the user turn up the volume of their speakers in order to obtain access.

The above process may be performed each time the user requests access to resources wherein the access is tied to the user listening to audio advertisements. Such instances may include logging on to an Internet Service Provider, accessing a particular web page, logging on to a web based service, requesting access to a particular data file, downloading of a data file, or the like. In addition, the above test may be performed periodically during the user's accessing of resources in order to verify that the user has not turned down his/her speakers to avoid listening to the audio advertisements.

These and other features and advantages will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As mentioned above, the present invention provides an apparatus and method for verifying audio output at a client device. The present invention is preferably implemented in a distributed data processing system, such as a local area network, wide area network, the Internet, or the like. Therefore, the following figures will provide a brief overview of a distributed data processing environment, a server computing device, and a client computing device, in order to provide a context in which the present invention will be described.

Figure 1:
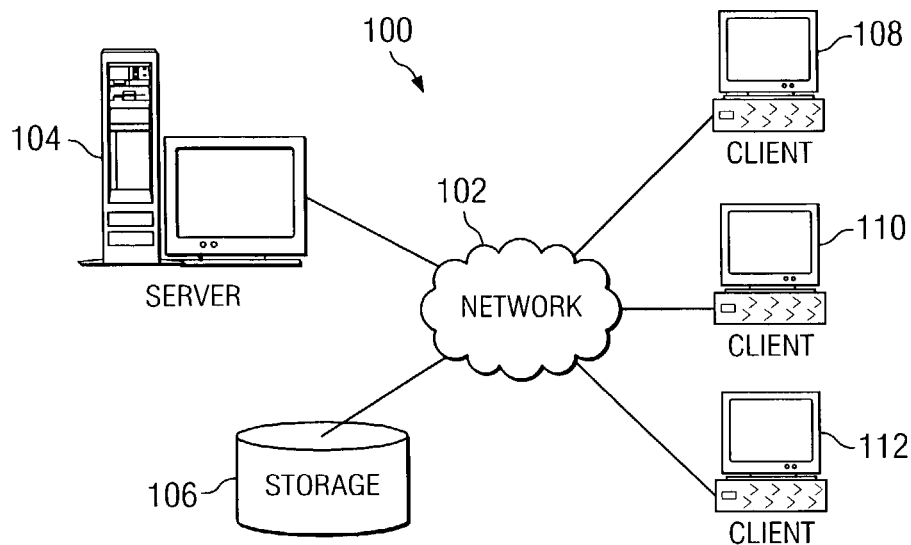
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
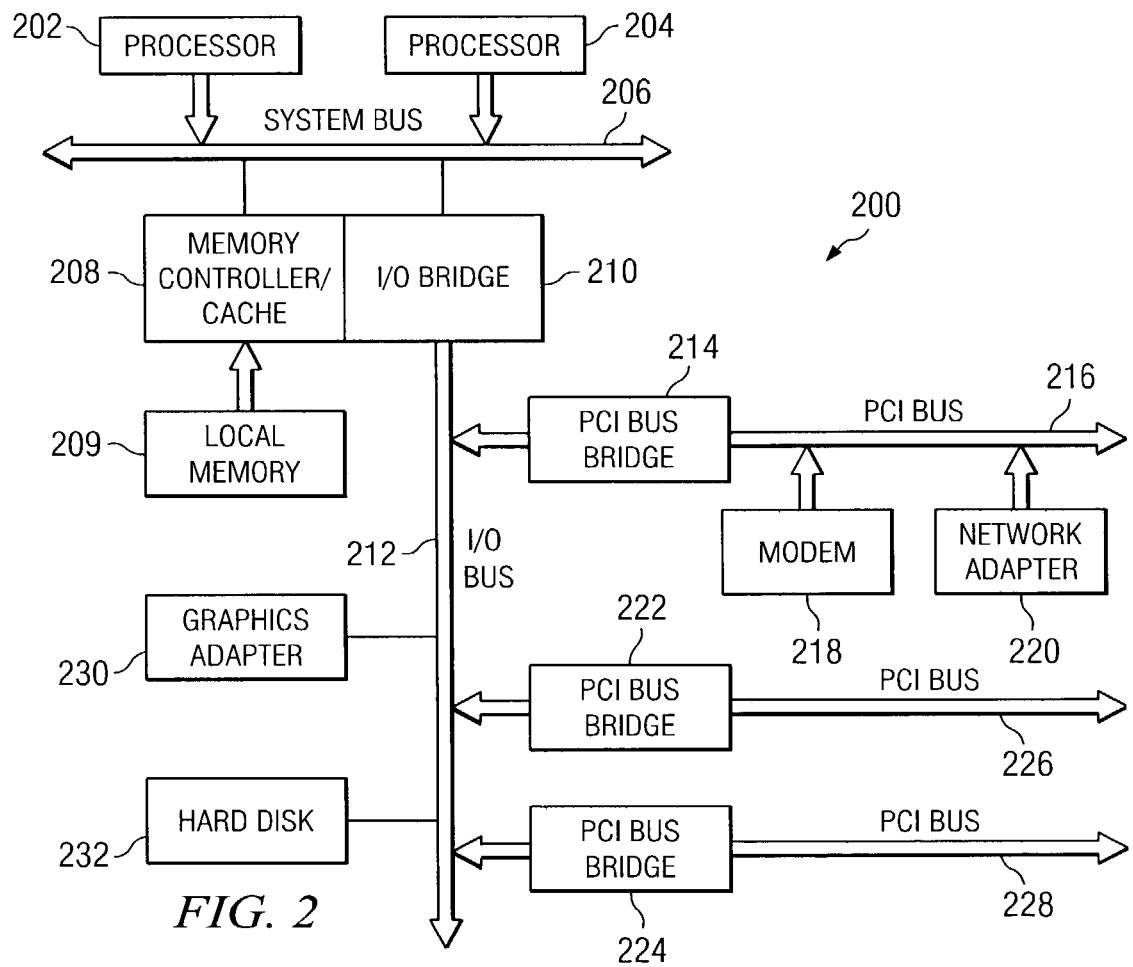
FIG. 2 is an exemplary block diagram of a server computing device according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
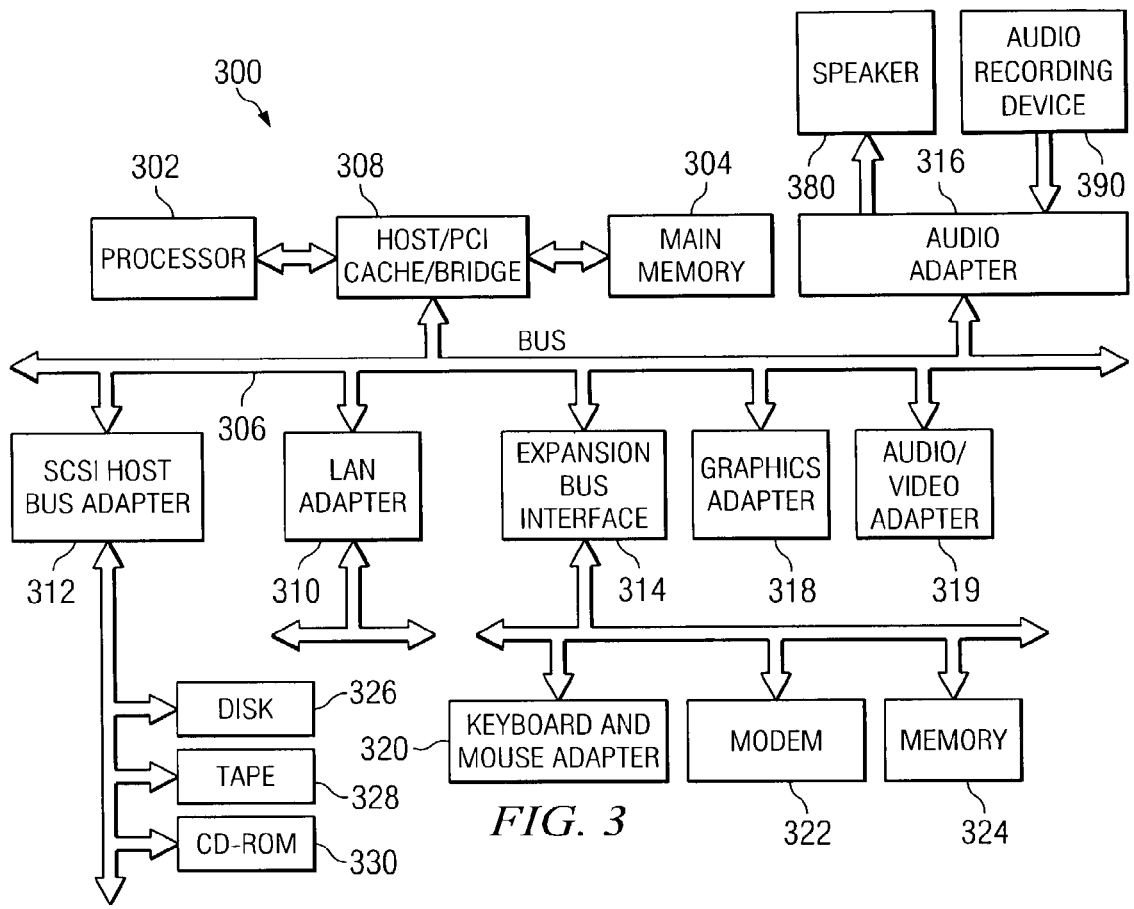
FIG. 3 is an exemplary block diagram of a client computing device according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3.

Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As illustrated in FIG. 3, the data processing system 300 further includes a speaker 380 and an audio recording device 390. These components of the data processing system 300 are utilized with the present invention to verify that the data processing system 300 is outputting audio via the speaker 380 at a volume level that is sufficient for the user to hear audio data being sent to the data processing system 300 from the server, e.g. server 104. Such verification may be used to control access to resources of the server 104, for example.

With reference again to FIG. 1, with the present invention, a user of a client device 108, for example, may request access to resources on server 104. The server 104 may then retrieve a user profile for the user or the client device 108 requesting the access to the resources. This user profile may be stored on the server 104, in a separate database, such as database 106, or the like.

The server 104 determines from parameters included in the user profile, whether the user is to be provided with audio advertising as a requirement for obtaining access to the resources requested. For example, if the user has elected to pay a subscription fee for access to the resources, the user may be provided with access without having to listen to audio advertising. However, if the user has elected to not pay a subscription fee, the user may be provided with access only if the user agrees to listen to audio advertising. The user profile includes information identifying whether the user is a paying subscriber or a non-paying subscriber in such a case.

Based on the user profile information, the server 104 determines whether audio advertisements are to be provided to the user of the client device 108. If audio advertisements are to be provided, the server 104 may perform one or more tests to first determine the presence of an audio adapter in the client device 108. For example, a transport protocol check of the client device 108 configuration information may be performed to determine if a sound card driver is installed and operational in the client device 108. This indicates that the client device 108 has a sound card that is used to output audio via one or more speakers. Such sound cards will also typically include a recorder input for coupling to a microphone or other audio signal pickup device. If the client device 108 does not have an audio adapter and audio advertisements are to be provided to the client device 108, then the requested access may be denied with a message being sent to the client device 108 for display to the user that indicates the reason for denying access to the resources.

If the client device 108 includes an audio adapter, the server 104 then initiates a test of the audio output of the client device 108. This test may include, for example, sending audio data to an agent application resident on the client device 108. This agent application may receive the audio data and output the audio data as sound via the audio adapter and speakers associated with the client device 108. In addition, the agent application may initiate recording of the sound that is output from the speakers using a recording device, such as a microphone, and a recording application or functionality within the client device agent associated with the client device 108. For example, the WinADR™ application may be used to record the audio output by the speakers in an MP3 format.

The recording of the audio output from the speakers is stored in a data file which is then uploaded to the server 104. The server 104 receives the data file and compares the recorded data to the test audio data to determine if the sound output by the speakers was the same sound that is generated by the test audio data. This comparison, in a preferred embodiment, is performed by using pattern matching to determine if the patterns between the two data files match. Other mechanisms may be used for comparing the data files to determine if they match without departing from the spirit and scope of the present invention.

If the two data files match, then it is determined that the client device 108 is outputting the audio data that was sent to it from the server 104. Thus, access to the resources may be granted to the user of the client device 108. In addition, the server 104 may analyze the characteristics of the recorded data to determine if the output of the audio data has the characteristics desired by the supplier of the audio data. That is, the characteristics of the recorded data may be analyzed and future audio data parameters adjusted based on the analyzed characteristics of the recorded data. For example, the recorded data may be analyzed to determine the volume at which the audio data is output, the amount of bass in the audio output, the amount of tone in the audio output, and the like.

Based on the results of this analysis, the output parameters of future audio data sent to the client device 108 may be adjusted so that a desired output is achieved. For example, the volume may be increased or decreased, the amount of tone may be increased or decrease, the amount of bass may be increased or decreased, and the like.

If it is determined that the client device 108 is outputting the audio data sent to it by the server 104, access to the system resources is granted. Thereafter, audio advertising may be output to the client device 108 while the user is accessing the system resources. This audio advertising will be sent to the client device 108 as data files along with output parameter data for adjusting the output of the audio via the audio adapter of the client device 108. The agent application receives this audio advertisement data and the output parameters, adjusts the output of the audio adapter, via software settings, based on the output parameters and outputs the audio advertisement via the audio adapter and the speakers of the client device 108.

During the access to system resources by the user of the client device 108, the above process for testing that audio being sent to the client device 108 is actually being output by the speakers of the client device 108 may be periodically performed. In this way, it can be determined whether the user has turned off his/her speakers or otherwise turned the volume of the speakers to a low level at which the audio advertising is not heard by the user. Thus, by periodically testing the audio output at the client device 108, the present invention may ensure that users cannot circumvent their duty to listen to audio advertising in exchange for free access to system resources.

If during the comparison of the recorded data with the original test audio data it is determined that there is not a match, access to the system resources is denied. In addition, a message may be sent to the client device 108 indicating that the access has been denied and the reason why access has been denied. This message may prompt the user to turn on their speakers or turn up the volume of their speakers and attempt the access again.

Thus, with the present invention, a verification is made that the client device is presently outputting audio via the client device speakers in order to ensure that the user is listening to audio data sent to the client device. While the present invention is described in terms of sending audio advertisements, the present invention is not limited to such. Rather, any application of the present invention may be made in which it is desirable to verify that the client device currently is outputting audio data sent to it. For example, the present invention may be utilized in a testing application where it is desirable to verify that test instructions in an audio format are being output by the client device. Other applications of the present invention will be apparent to those of ordinary skill in the art in view of the present description.

In addition, while the present invention is described with regard to the server 104 performing the comparison of test audio data to recorded data, the present invention is not limited to such. Rather, the present invention may be implemented such that the comparison is performed within the agent application on the client device. Moreover, the present invention may be implemented such that all functions are performed within the client device and a server is not necessary. In such a case, the verification is to ensure that audio data generated by an application on the client device that should be output via the speakers of the client device is in actuality being output by the speakers.

Figure 4:
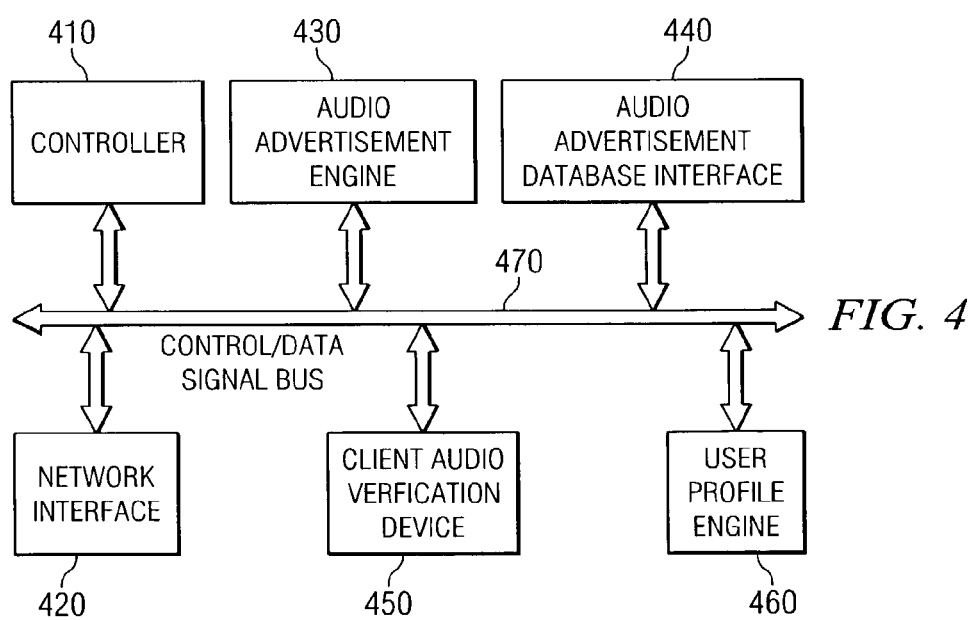
FIG. 4 is an exemplary block diagram illustrating the primary operational components of the present invention.

FIG. 4 is an exemplary block diagram of an audio output verification mechanism according to the present invention. The elements shown in FIG. 4 may be implemented in hardware, software, or any combination of hardware and software. In a preferred embodiment, the elements in FIG. 4 are implemented as software instructions executed by one or more processing devices in a computing system.

As shown in FIG. 4, the audio output verification mechanism includes a controller 410, a network interface 420, an audio advertisement engine 430, a client audio verification device 450, an audio advertisement database interface 440, and a user profile engine 460. The elements 410-460 are in communication with one another via the control/data signal bus 470. While a bus architecture is shown in FIG. 4, the present invention is not limited to such and any architecture that facilitates the communication of control/data signals between the elements 410-460 may be used without departing from the spirit and scope of the present invention.

The controller 410 controls the overall operation of the audio output verification mechanism and orchestrates the operation of the other elements 420-460. The network interface 420 provides a communication interface for communicating with client devices. The audio advertisement engine 430 generates advertisement data for sending to the client devices via the interface 420 based on audio advertisements retrieved from an audio advertisement database via the audio advertisement database interface 440. The client audio verification device 450 verifies that audio data sent to the client device is actually being output via speakers associated with the client device. The user profile engine 460 retrieves user profiles to determine if audio advertisements are to be sent to the users' client devices.

Figure 5:
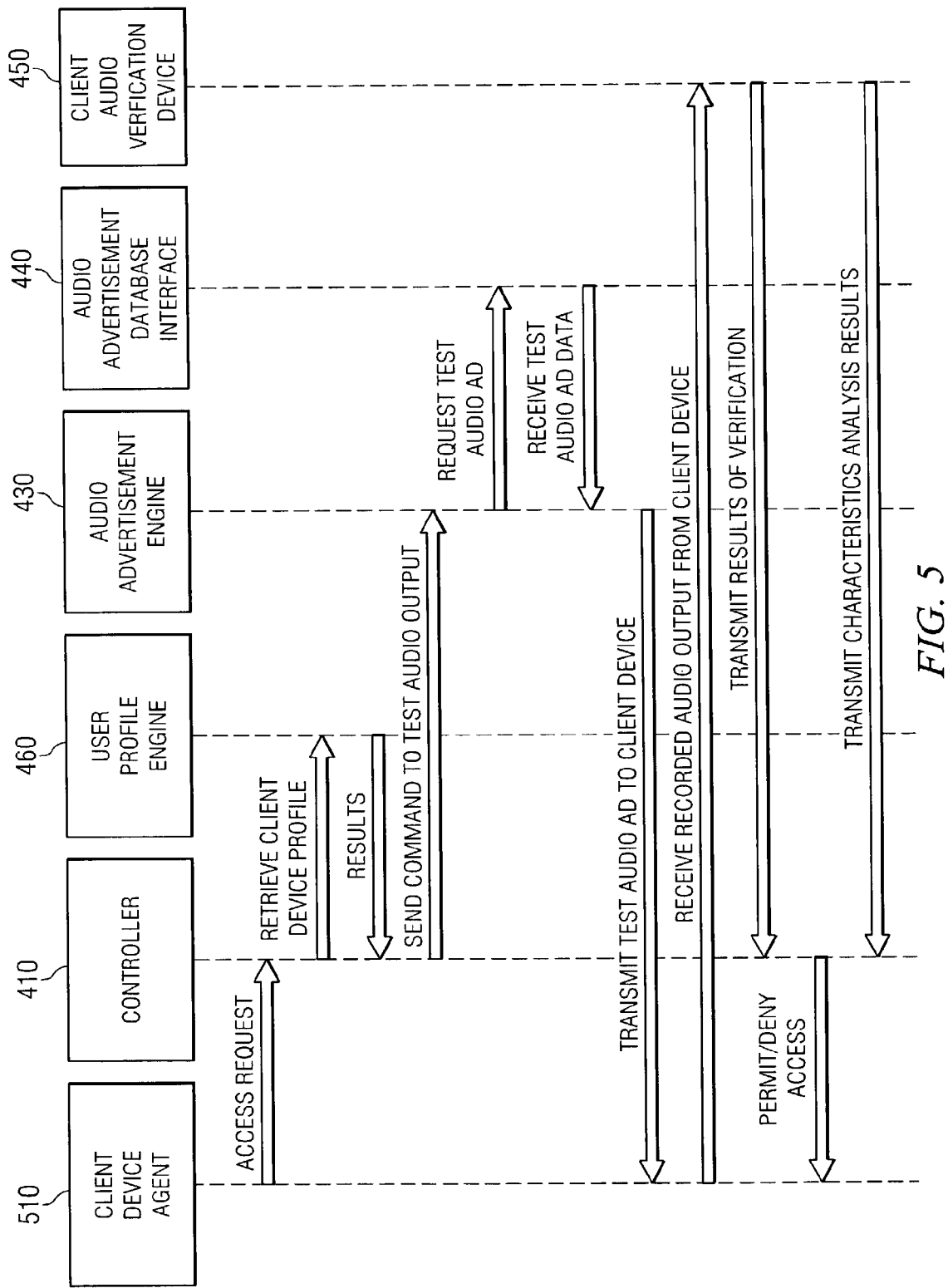
FIG. 5 is an exemplary diagram illustrating the manner by which the present invention operates with a client device.

The operation of these elements will now be described with reference to the message flow diagram of FIG. 5. As shown in FIG. 5, when the controller 410 receives a request for access to system resources via the network interface 420, the controller 410 instructs the user profile engine 460 to retrieve the user profile for the user requesting access and determine if audio advertisements are to be sent to the user's client device. The user profile engine 460 retrieves the user's profile and determines if audio advertisements are to be sent to the user's client device and returns the result to the controller 410. It is assumed in the depicted message flow that it is determined that audio advertisements are to be sent to the client device via the client device agent 510.

The controller 410 then sends a command to the audio advertisement engine 430 to send test audio data to the client device. The audio advertisement engine 430 sends a request for a test audio advertisement to the audio advertisement database interface 440 which retrieves a test audio advertisement and forwards it to the audio advertisement engine 430. The audio advertisement engine 430 then transmits the test audio advertisement data to the client device agent 510 which outputs the audio advertisement and records the sound output by the speakers of the client device.

The recorded audio output data is then transmitted by the client device agent 510 to the client audio verification device 450. The client audio verification device 450 compares the recorded data with the original test audio advertisement data to determine if there is a match. The client audio verification device 450 then transmits the results of verification to the controller 410. Based on the results from the client audio verification device 450, the controller 410 either permits or denies access to the resources.

In addition, the client audio verification device may analyze the characteristics of the recorded data and send the results of the analysis to the controller 410. The controller 410 may make use of this analysis when outputting future audio advertisement data for to the client device agent 510. In this way, the controller 410 may adjust output parameters of the audio advertisement data so that the audio advertisement is output in a preferred manner on the client device.

Figure 6:
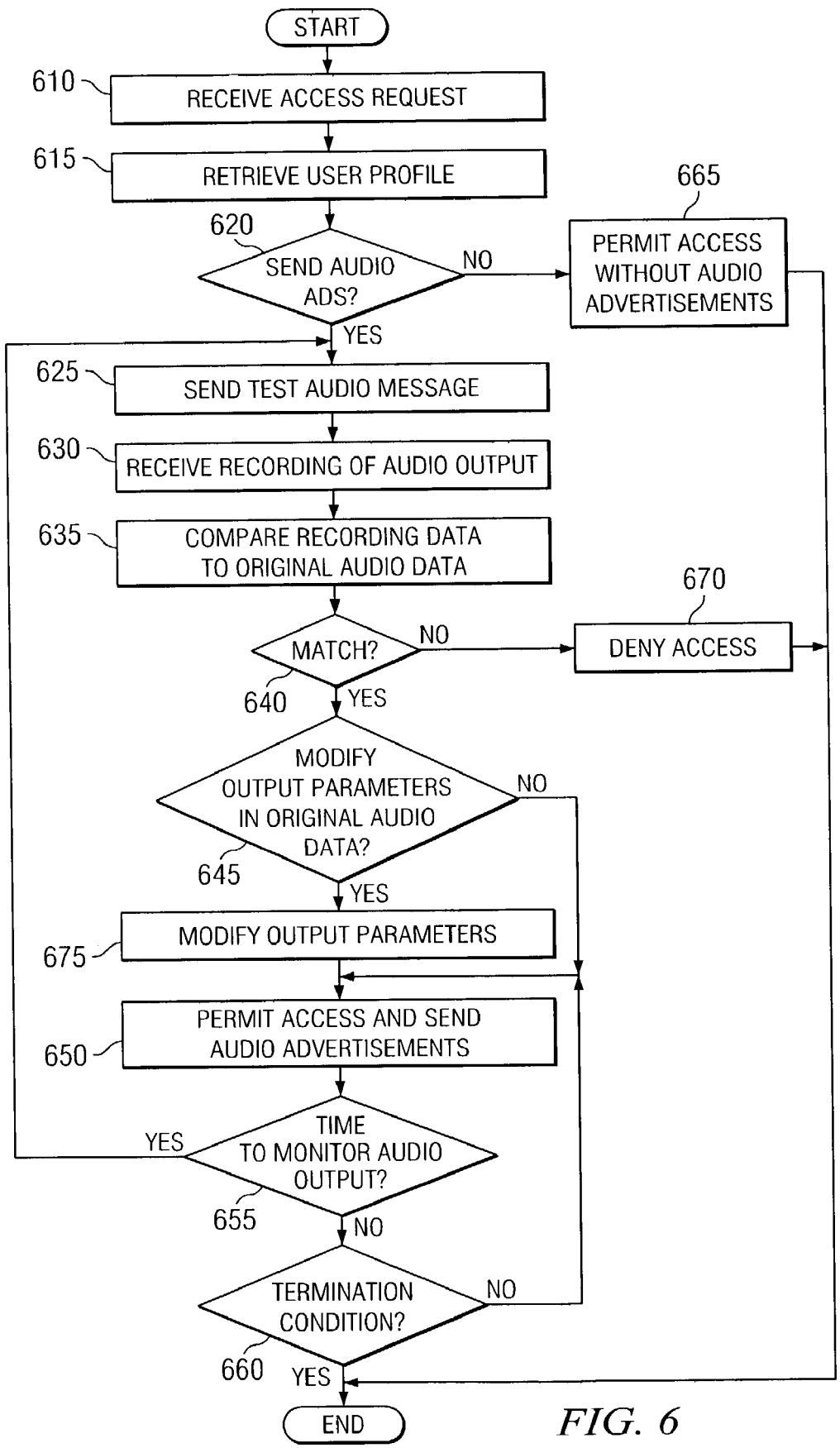
FIG. 6 is a flowchart outlining an exemplary operation of the present invention.

FIG. 6 is a flowchart outlining an exemplary operation of the present invention. As shown in FIG. 6, the operation starts with receiving an access request (step 610). A user profile is then retrieved (step 615) and a determination is made as to whether audio advertisements are to be sent to the client device (step 620). If not, access is permitted without the sending of audio advertisements (step 665) and the operation terminates. If audio advertisements are to be sent to the client device, a test audio message is sent to the client device (step 625). A client device agent then outputs the test audio message and records the sound emitted by the speakers of the client device.

The recorded data from the client device is then received (step 630) and is compared to the original test audio data (step 635). A determination is made as to whether there is a match (step 640). If not, access is denied (step 670). Otherwise, a determination is made as to whether the output parameters for future audio advertisements should be modified (step 645). If so, the output parameters are modified according to an analysis of the recorded data (step 675).

Thereafter, or if no modifications to output parameters is necessary, access to the system resources is permitted and audio advertisements are sent (step 650). Thereafter, a determination is made as to whether it is time to monitor the audio output again (step 655), i.e. has a predetermined period of time elapsed for periodic checking of the sound output at the client device. If so, the operation returns to step 625. Otherwise a determination is made as to whether a termination condition has occurred (step 660). Such a termination condition may include, for example, logging off of the server, the web browser application accessing a different web page, or the like. If no termination condition has occurred, the operation returns to step 650. Otherwise, if a termination condition has occurred, the operation is terminated.

Thus, the present invention provides a mechanism for monitoring the sound output at a client device to ensure that the user of the client device is listening to audio data sent to the client device. In this way, a supplier of a service or resources may be assured that a user that has not paid for access to such services or resources is listening to audio advertisements in exchange for non-paid access to such services and resources.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of verifying audio output at a client device, the method comprising:
   receiving, using a hardware processor, a request for access to a system resource;
   determining, using the hardware processor, based on parameters in a profile for the client device, whether audio advertising is required in exchange for granting access to a system resource by verifying, using the parameters in the client device profile, whether to provide an audio advertising to the client device, wherein the parameters in the client device profile provides subscription information that indicates whether access to system resources is fee-based;
   responsive to determining that the profile specifies a requirement for audio advertising in exchange for system access, determining, using the hardware processor, whether the client device has an audio adapter by performing a transport protocol based check of a configuration of the client device to verify presence of a sound card driver in the client device;
   responsive to verifying the client device has the audio adapter, transmitting, using the hardware processor, test audio data to the client device;
   receiving, using the hardware processor, recorded data transmitted from the client device, wherein the recorded data comprises an audio recording of the sound output of the test audio data by the client device;
   comparing, using the hardware processor, the received recorded data to the test audio data;
   verifying, using the hardware processor, whether the recorded data matches the transmitted test audio data; and
   responsive to the recorded data matching the test audio data, permitting, using the hardware processor, access to the system resource.

2. The method of claim 1, wherein the test audio data comprises an audio advertisement.

3. The method of claim 1, wherein the verifying comprises:
   storing the received recorded data in a data file; and
   performing a pattern matching between the data file and the test audio data.

4. The method of claim 1, further comprising:
   analyzing at least one characteristic of the received recorded data;
   comparing the at least one characteristic of the received recorded data to at least one characteristic of the test audio data; and
   adjusting a parameter of the at least one characteristic of the received recorded data based on the comparing to achieve a desired output.

5. The method of claim 4, further comprising:
   adjusting the at least one characteristic of the test audio data based on the comparing.

6. The method of claim 5, wherein the at least one characteristic is at least one of volume, tone, and bass.

7. The method of claim 1, further comprising:
   denying access to the system resource responsive to the received recorded data not matching the test audio data; and
   transmitting a message indicating a reason for the denial of access.

* * * * *